J. GWYNN
BUCKETS FOR CHAIN-PUMPS.
No. 173,461. Patented Feb. 15, 1876.
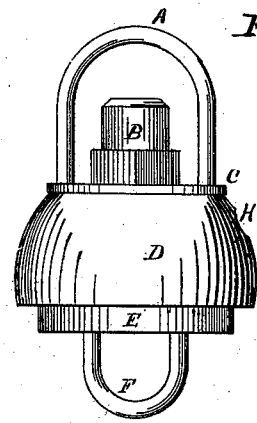
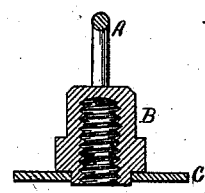
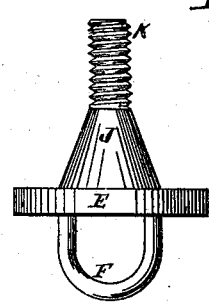
WITNESSES:
L. J. Reese
S. A. Leister
INVENTOR:
Joseph Gwynn
by John Gwynn & Son
Attorneys.

UNITED STATES PATENT OFFICE.

JOSEPH GWYNN, OF TIFFIN, OHIO.

IMPROVEMENT IN BUCKETS FOR CHAIN-PUMPS.

Specification forming part of Letters Patent No. 173,461, dated February 15, 1876; application filed January 3, 1876.

*To all whom it may concern:*

Be it known that I, JOSEPH GWYNN, of Tiffin, in the county of Seneca and State of Ohio, have invented certain new and useful Improvements in Buckets for Chain-Pumps; and do hereby declare that the following is a full, clear, and exact description thereof, reference being had to the accompanying drawings, and the letters of reference marked thereon, the same letters referring in each drawing to the same part, and which form part of this specification.

Figure 1 is a side view of my bucket for chain-pumps. Fig. 2 is a longitudinal vertical section of the upper half. Fig. 3 is a side view of the lower half entire. Fig. 4 is a longitudinal vertical section of the rubber D and vent-hole H, showing the cavity which sets on the cone J.

The object and purpose of my invention is to construct a bucket for chain-pumps that shall exclude the water from the tightening-screw, as will be hereafter fully set forth, that the compression of the rubber shall be without any friction on the plate C; and, second, that the compression can be made without having to detach the chain, as will be explained.

To enable others skilled in the art to which my invention appertains to make and use the same, referring to the said drawings, it will be seen that Fig. 3 consists of the plate E, loop F, cone J, and the male screw K, for the purpose of receiving the nut B. It is also shown in Fig. 2 that B is a nut, having suitable squares on the same, but working separately in the hole through the plate C. It will also be seen that the lower end of the nut B comes through and below the plate C, in order that the surface of the nut shall exclude the water from the screw K by its contact with the upper surface of the rubber disk D. The under side of the square on the nut B, forming a shoulder, rests on the plate C. It will be seen that it is not necessary to move the plate C at all. The nut B is turned by a suitable wrench, supplied with the buckets; and it is by turning the nut B that the detachment from the chain is avoided, and which cannot be effected in any other. The plate C and the loop A form the attachment of the chain on the upper side, the nut B resting in the plate C, as shown in Fig. 2. The lower part, consisting of plate E, loop F, cone J, and screw K, is ready to receive the rubber disk D, the space I fitting on the cone J. The disk D is made to fit on the cone J snug, in order that the compression of the plate C shall have full effect. The screw K passes up through the space, as shown at I, and the nut B is screwed thereon, in the manner above described.

I am aware that screwing a rubber disk between clamps is not new, except in the manner and form above described, and I lay no claim to it, broadly, as my invention.

Having thus fully described my invention, what I claim, and wish to secure by Letters Patent, is—

1. The plate E, cone J, screw K, with the bail F attached, in combination with the disk D, constructed as described, and for the purpose set forth.

2. The closed nut B, working through the plate C with the projecting end, for the purpose of pressing on the disk D, and in combination therewith, constructed as described, and for the purpose set forth.

In witness that I claim the foregoing I hereunto set my hand this 29th day of December, 1875.

JOSEPH GWYNN.

Witnesses:
L. T. REESE,
S. A. LEISTER.